United States Patent Office 3,344,562
Patented Oct. 3, 1967

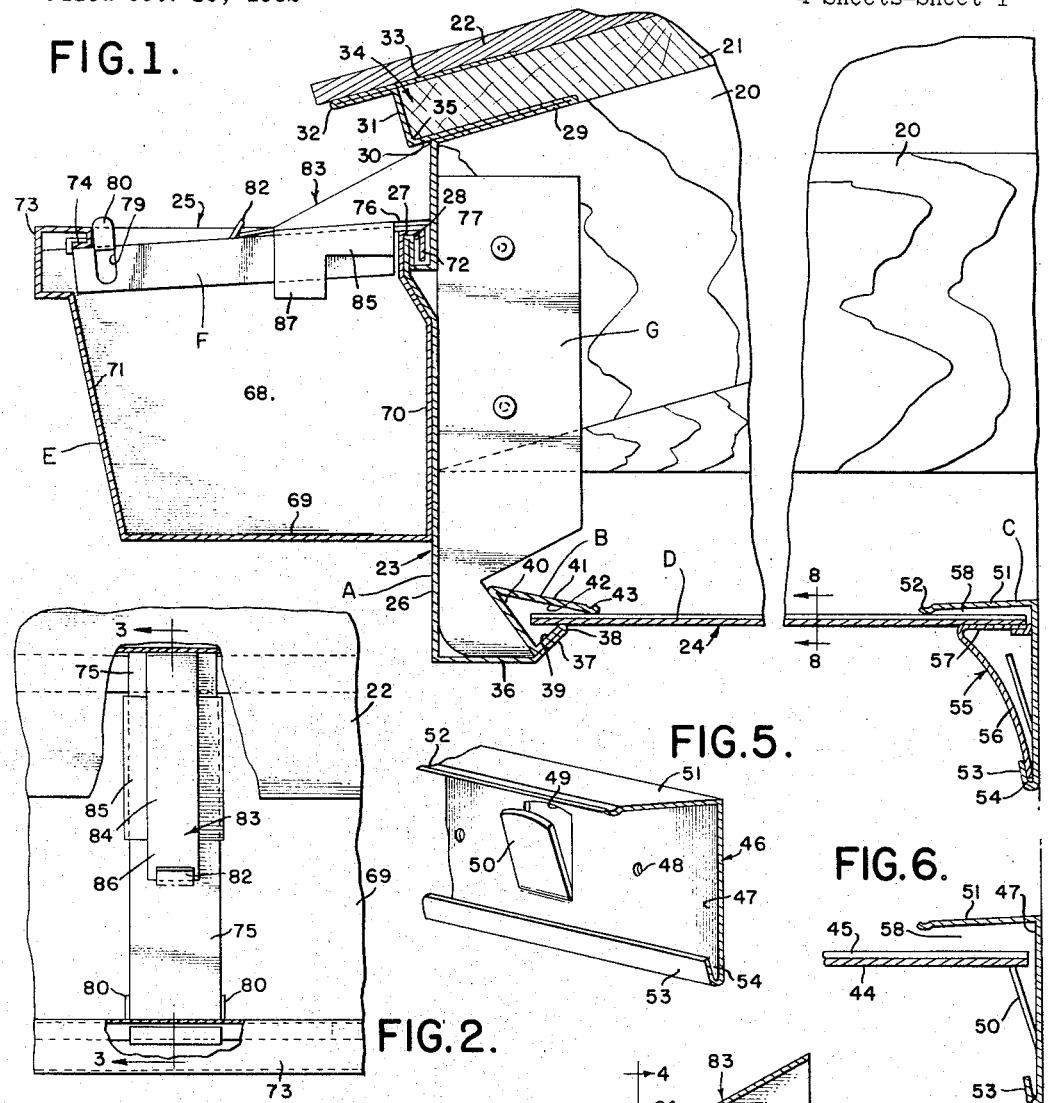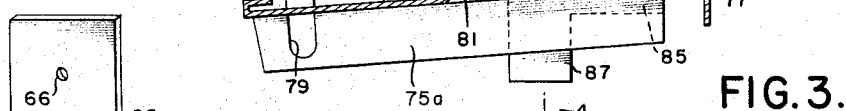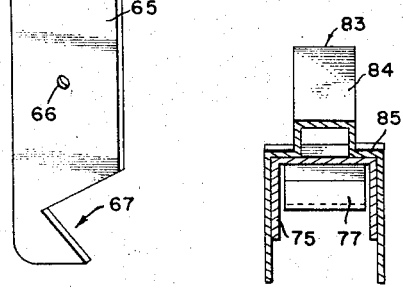

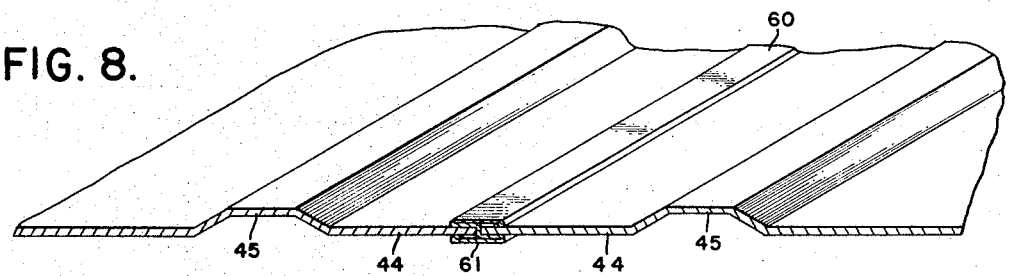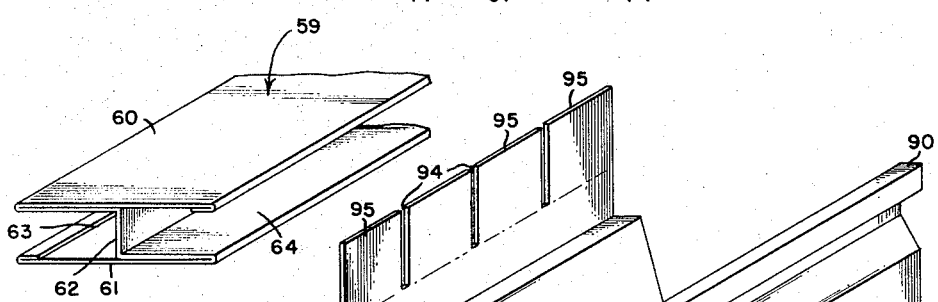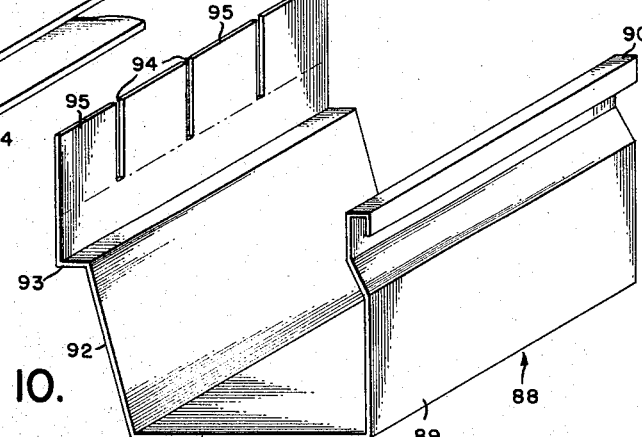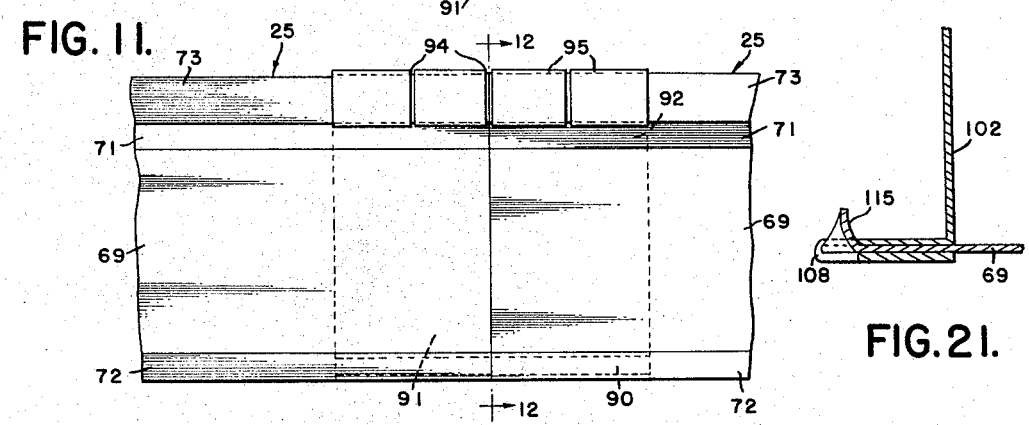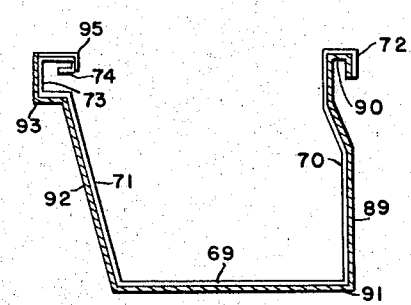

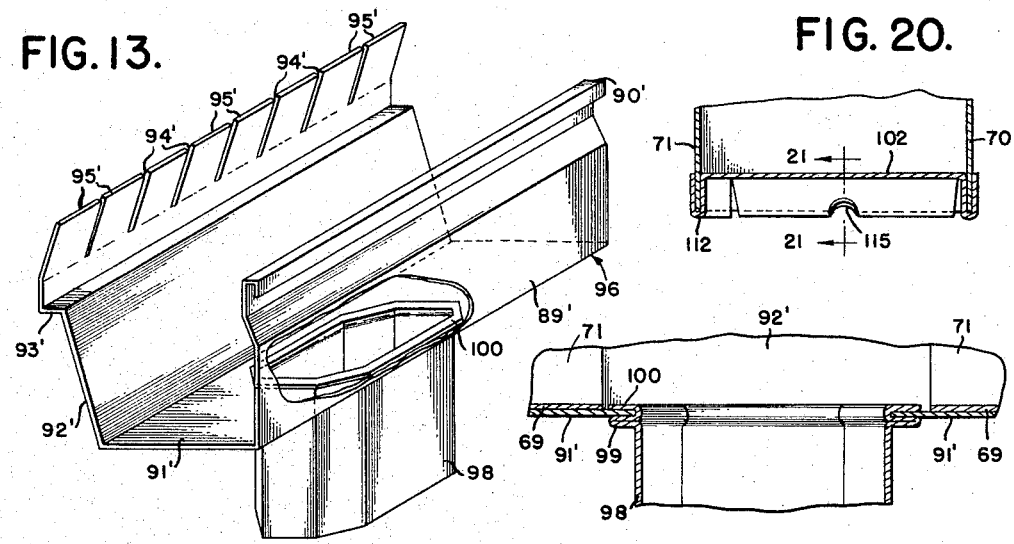

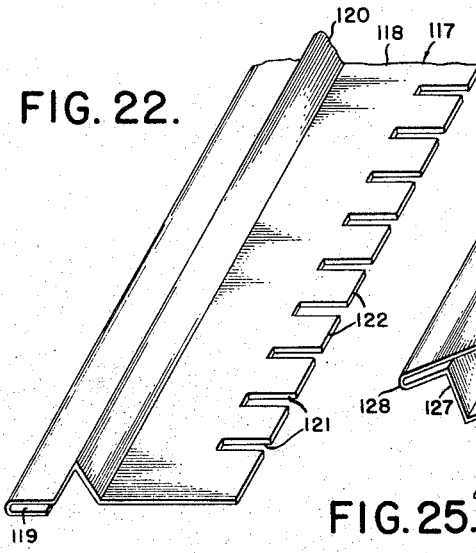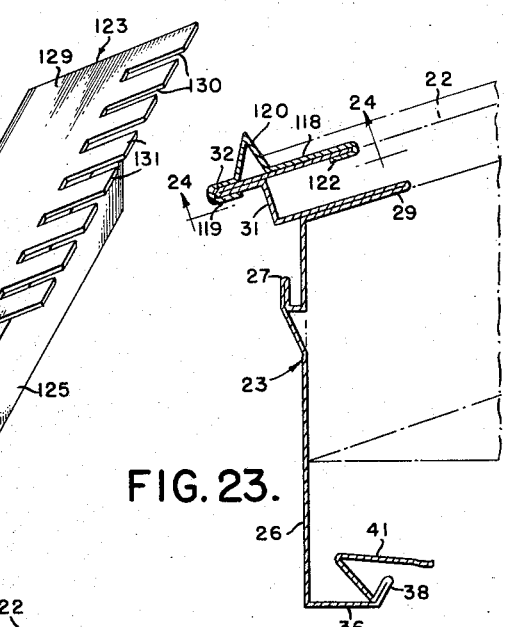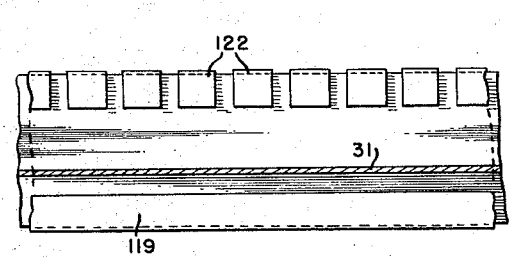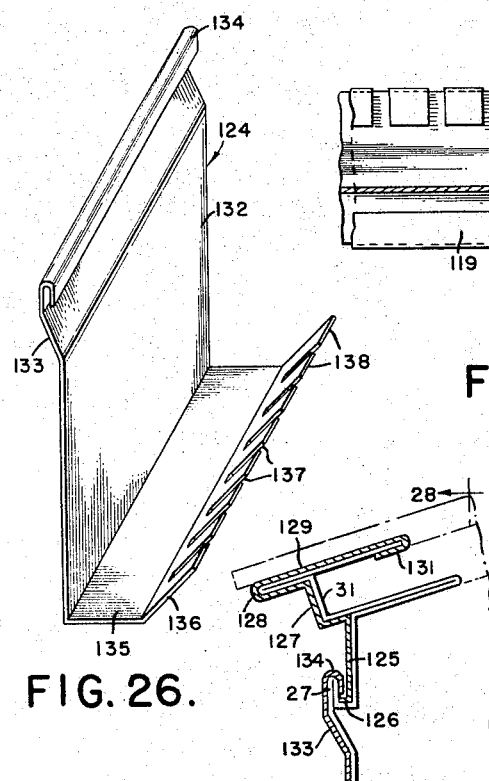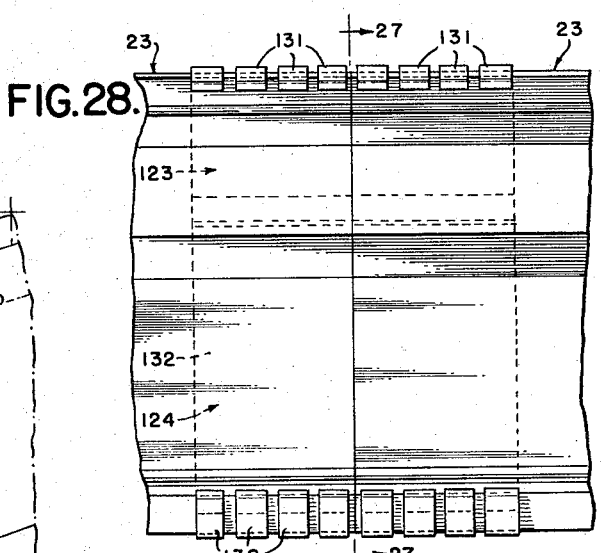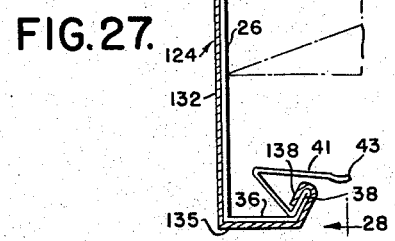

3,344,562
CORNICE SYSTEM
Russel T. Miles and Philip R. Anderson, Easton Md., assignors to Corinthian Cornice Systems, Inc.
Filed Oct. 18, 1962, Ser. No. 231,499
9 Claims. (Cl. 52—11)

This is a continuation-in-part of application Ser. No. 95,901, filed Mar. 15, 1961.

The present invention relates to a cornice which overlies the ends of, and underlies the bottoms of, the rafters which project beyond the walls of a building structure, such as in present day ramblers.

More particularly the cornice comprises a plurality of sections which are assembled into a unit by interengaging frictional securing means, the assembly being accomplished either before attachment to or during attachment to the building.

The complete cornice presents a fascia, a gutter, and a soffit which preferably have minimum lengths of 16 feet, with the successive lengths interconnected, one to another, by suitable joining means, thereby providing a continuous unit around the entire building to which it is attached.

The unit is fabricated of light materials, as hereinafter fully described, in a manner to utilize the spring back or flexibility of the material, thereby to provide the required interengaging frictional securing means, and in this way the necessity for any special tools in the assembly thereof, or the use of skilled labor, is completely eliminated.

The unit further includes co-operating hanger means for attaching and positioning the unit on the building structure. The hanger means are such that when the fascia of the unit is positioned on the building, the hangers will compensate for any misalignment of the rafter ends. Because of this, pre-trimming of the rafter ends to assure that each projects a fixed distance from the building wall is eliminated. As a result, substantial savings are achieved in building costs, as it has been found that when roof trusses, prefabricated to identical lengths, are used, misalignment occurs during the erection, or due to the swelling or shrinkage of the lumber. Additionally the unit is attached to the building by nailing it thereto, all of the nailing being beneath the roof, fully hidden and protected from the weather.

An additional advantage is found by the incorporation in the unit of a sheathing end channel or pocket, assuring alignment of the outer ends of the roof sheathing. Again, if any trimming of the sheathing is required it may be conveniently and rapidly done at the inner ends thereof.

It becomes obvious from the foregoing that a principal object of the invention is to provide a cornice of such simple construction that it may be readily installed by one having ordinary skill, thus eliminating a number of work operations heretofore required, and providing a substantial reduction in the cost of the building.

A still further object is a unit of the type described which may be installed on a complete building, such as a 20 by 40 foot rambled in a matter of hours, as compared to days, as heretofore required to provide a proper finish, again resulting in a substantial reduction in costs.

A still further object is to provide a unit which is completely finished, including the painting or coloring thereof, which when installed does not require further attention.

A still further object is a unit which may be prefabricated and carried in stock, inasmuch as allowance is made for variations in the depth and length of the projecting rafters, and standard units may be readily used.

The foregoing and other objects of the invention will be clearly understood from the description herein when read in view of the attached drawings.

In the drawings:

FIGURE 1 is a fragmentary transverse sectional view of the assembly of the present invention, illustrating its application;

FIGURE 2 is an enlarged top plan view of the same, illustrating its application, portions thereof being broken away to disclose details of construction;

FIGURE 3 is a sectional view taken along the line 3—3 of FIGURE 2, looking in the direction of the arrows;

FIGURE 4 is a sectional view taken along the line 4—4 of FIGURE 3, looking in the direction of the arrows;

FIGURE 5 is a fragmentary perspective view of a soffit plate receiver and connector constructed in accordance with the present invention;

FIGURE 6 is an edge elevational view of the same, illustrating its application;

FIGURE 7 is a perspective view of a hanger plate constructed in accordance with the present invention;

FIGURE 8 is a fragmentary perspective view of a soffit unit and joining bar forming a part of the present invention;

FIGURE 9 is a perspective view of a joining bar per se forming a part of the present invention;

FIGURE 10 is a perspective view of a gutter connecting section forming a part of the present invention;

FIGURE 11 is a side elevational view of the same, illustrating this application;

FIGURE 12 is a sectional view taken along the line 12—12 of FIGURE 11, looking in the direction of the arrows;

FIGURE 13 is a perspective view of a gutter connector outlet section forming a part of the present invention;

FIGURE 14 is a top plan view of the same, illustrating its application;

FIGURE 15 is an enlarged sectional view taken along the line 15—15 of FIGURE 14, looking in the direction of the arrows;

FIGURE 16 is a perspective view of a gutter clip end cap, forming a part of the present invention;

FIGURE 17 is a side elevational view of the gutter clip end cap, illustrating its application;

FIGURE 18 is a sectional view taken along the line 18—18 of FIGURE 17, looking in the direction of the arrows;

FIGURE 19 is a sectional view taken along the line 19—19 of FIGURE 17, looking in the direction of the arrows;

FIGURE 20 is a sectional view taken along the line 20—20 of FIGURE 17, looking in the direction of the arrows;

FIGURE 21 is an enlarged transverse sectional view of the gutter clip end cap, illustrating the manner of securing a gutter section thereto;

FIGURE 22 is a perspective view of a gravel stop forming a part of the present invention;

FIGURE 23 is a vertical sectional view of the cornice facing of the present invention showing the manner of attachment of the gravel stop thereto;

FIGURE 24 is a sectional view taken along the lines 24—24 of FIGURE 23, looking in the direction of the arrows;

FIGURE 25 is a perspective view of a top cornice connector forming a part of the present invention;

FIGURE 26 is a perspective view of a bottom cornice connector forming a part of the present invention;

FIGURE 27 is a sectional view taken along the lines 27—27 of FIGURE 28, looking in the direction of the arrows and showing to advantage the manner of engaging the top and bottom cornice connectors with the cornice facing; and FIGURE 28 is a sectional view taken along the lines 28—28 of FIGURE 27, looking in the direction of the arrows.

Referring to the drawings, there is illustrated in FIGURE 1, a rafter portion 20 which projects beyond the edge of a building wall and thus overhangs it. Secured to the rafter end, and the wall of the building is the cornice comprising a fascia A, which has integrally secured thereto, a forward mold bar B; a rear mold bar C; a soffit plate D, positioned and secured in place by the mold bars B and C; a gutter E, carried by the fascia A; gutter spanners F securing the gutter to the fascia A; and a hanger G for securing the unit to the end of the rafter 20. For simplicity in illustrating only one rafter end has been shown, each of the above referred to elements (except the spanners and hangers) having lengths preferably exceeding sixteen feet.

The building unit is fabricated from any suitable lightweight material wherein by proper forming, the springback may be retained and the units may be made from sheets or extruded into the required shapes. Units are now being manufactured from pre-painted sheet aluminum, although sheet iron, stainless steel, copper, plastic or other suitable materials could be used. The units are being made in lengths of 16 feet, with a wall thickness of .019 inch. As stated, the materials should be such that a springback may be retained therein, the springback being utilized to permit ready flexing of portions thereof to provide frictional interengaging securing means, eliminating the necessity for any mechanical securing means.

Referring to the fascia A, it includes an elongated rectangular vertical facing member 23 adapted to overlie the ends of the rafters 20. The member 23 is of greater depth than the ends of the rafters to permit its use on rafters of different depths and assure proper positioning of the soffit D beneath the rafters. Approximately one half the depth of the rafter ends, the facing member 23 is formed, as clearly shown in FIGURE 1, to provide an upwardly facing lip 27 and channel 28, for suspending the gutter E, as hereinafter more fully described.

The upper edge of the facing member 23 is bent rearwardly and angularly upwardly to provide a channel wall 29 which will overlie the upper surface of the rafters 20, the wall 29 being reversed upon itself and carried forwardly of the facing member 23 whereupon it is bent upwardly at right angles to wall 29 to provide a channel bottom 31, the metal at the upper edge of the channel bottom then being bent forwardly for some distance to provide a drip edge 32, positioned well forwardly of the facing member 23, whereupon the metal is reversed upon itself to provide a second channel wall 33 parallel to the channel wall 29.

There is thus provided a channel or pocket 34 having a base wall 31 and parallel side walls 29 and 33 for receiving and positioning the ends of the sheathing 21. Inasmuch as the channel 34 is continuous, the outer ends of the sheathing will all be in alignment, whereupon any required cutting or trimming may be done at the inner ends of the sheathing, which are readily available to the workmen. The bottom wall 29 of the channel, adjacent corner 35, may be provided with a drain hole 30, to permit condensation to drain therefrom. It will be noted that the drip edge 32 projects well forwardly of the facing member 23, whereby water draining from the roof will feed directly into the gutter E, the drip edge 32 also serving as a guiding edge for whatever roofing material 22 is used.

The portion 26 of facing member 23 is bent rearwardly and at a right angle to provide a bottom ledge 36, for carrying a forward mold bar B which is formed integrally with the fascia. As indicated in FIGURE 1, the rear edge of ledge 36 is bent upwardly and outwardly at an obtuse angle to provide a leg 37, the metal then being reversed upon itself to form a supporting lip 38, and then downwardly at 39 to overlie leg 37. Thereafter, the metal is bent upwardly at substantially a right angle to provide a second leg 40, whereupon the metal is again bent rearwardly at an acute angle to provide a third leg 41, of sufficient length to extend beyond the lip 38, this leg terminating in a strengthening bead 43. This construction provides a substantially right angle triangle mold bar, having a base leg 40, and a pair of legs 37 and 41 projecting therefrom at such angles that lines drawn therethrough would intersect, and with one leg projecting beyond the end of the other leg, the longer leg, due to the springback of the material, normally flexing towards engagement with the end of the shorter leg.

The triangular mold bar B defines a pocket or channel 42 into which the forward edge of the soffit plate D may be received, and the ends of the leg members 38, 41 define an expansible throat through which the edge of the plate may be forced to enter the pocket 42. This construction permits the use of soffit plates of different thicknesses, or of different materials, and if a material has a tendency to expand or contract, such as wood, leg 41 will spring or flex therewith, while still frictionally engaging engaging and holding the soffit plate in position on the underlying lip 38 of the leg 37.

The inner or rear edge of the soffit plate D is secured and supported by a second substantially right angle triangular mold bar C. As best seen in FIGURES 1 and 5, the mold bar C comprises a base leg 46 which may be secured to the walls of a building simply by nailing it thereto, as by nails extending through the openings 48. Extending upwardly and angularly from the lower edge of the leg 46 is a second leg 56, the upper end of which is turned rearwardly to provide a suporting edge or lip 57. Projecting forwardly from the upper end of the leg 46 is a third leg 51, the outer end of which is beaded at 52 to give it strength. The leg 51 is of sufficient length to extend beyond the leg 56, and again lines drawn through the legs 51 and 56 would intersect. The legs 46, 51 and 56 also define a pocket 58 into which the rear edge of the soffit plate D may be received through the throat defined between the end of the spring leg 51 and the supporting edge 57 of the leg 56. To assist in the assembly of the parts, the mold bar C is fabricated of two pieces, with the leg 56 being removably secured to the leg 46. To accomplish this the lower edge of the leg 47 is turned upwardly at 53 to form a channel 54 for receiving the lower edge of the forward leg 56.

With this construction, when the fascia A is in the position shown in FIGURE 1, the mold bar C may be readily aligned with the mold bar B. When both are aligned, the soffit D may be positioned by holding it at an angle with its forward edge upward and against the underside of the projecting end of the leg 41 of the mold bar B. The soffit plate may then be lifted upwardly to separate leg 41 from the leg 37, whereupon the soffit plate may be turned towards the horizontal and forced into the pocket 42 of the mold bar B.

With the forward edge of the soffit plate within the mold bar B, the rear edge may then be raised to underlie the spring leg 51 of the mold bar C and then lowered to rest upon the forwardly projecting tabs 50 which are stamped out from the rear leg 46. Thereafter, the lower edge of the supporting leg 56 is positioned within the channel 54, and the top supporting edge is positioned under the soffit plate and snapped rearwardly into position, whereupon the spring leg 51 will be flexed upwardly but will continue to exert a downward force resulting in the three parts being frictionally interengaged.

Although the mold bar B is shown as being formed out of the same piece of material as the facing member 23, it is obvious that it could be a separate member rigidly secured to the fascia, the construction shown being preferred as it eliminates the necessity for any type of riveting, welding, or other mechanical securing means. It is equally apparent that the mold bars B and C could be used in other environments for supporting a soffit plate D, and that each function in substantially the same manner, and have substantially the same means, even though in B, the leg 41 is the spring member, whereas in mold bar C the leg 51 is the spring member.

If the spacing between the mold bars is such that more than one width of soffit plate is required, two or more soffit plates as illustrated in FIGURE 8 may be used. As therein indicated the soffit plates 44 may, for strength or decorative purposes, be provided with longitudinally running raised sections 45, and the adjacent edges of the soffit plates 44 are interconnected by a longitudinally extending double channel member. As seen in FIGURE 9 the channel member is a single piece of material having parallel top and bottom plates 60, 61 interconnected by a Z bend to provide a centrally located vertical spacing and dividing wall 62, thereby defining two oppositely facing channels 63, 64 into which the edges of the adjacent soffits are respectively received.

Referring again to FIGURE 1, the fascia unit A is secured to the building structure by extremely simple hanger means G. As seen in FIGURES 1 and 7, the hanger means comprises a vertically rectangular elongated plate 65, terminating at its lower end in an acute angle rearwardly facing hook member 67. The plate 65 has one or more openings 66 through which nails may be inserted and then driven into the rafter members 20. As seen in FIGURE 1, the acute angle of the member 67 corresponds with the acute angle defined between the bottom leg 36 of the facing member 23 and the leg 40 of the mold bar B, whereby these two portions define a pocket into which the hook member 67 is received. The hook member acute angle is slightly larger than the pocket angle, so that it will force the member 40 clockwise and assures frictional engagement of the hook member within the pocket.

The forward edge of the hanger 65 parallels the rear face of the facing member 23, and thus the hanger, which is a substantial width, overlies the rafter 20 to which it may be secured as previously described. If the ends of the rafters 20 are not in proper alignment, the fascia need only engage the foremost projecting one, and any spacing between the fascia and shorter rafters is compensated for by the width of the hanger bar G. It should be understood that this misalignment seldoms exceeds a fraction of an inch, but heretofore when the ends of the rafters were covered by a straight running fascia, it was essential that all of the rafter ends be aligned or the fascia would not run true.

From what has been described it can be seen that the unit constitutes a complete cornice which could be used with or without a gutter member. If used without a gutter member, the lip 27 and gutter channel 28 would be eliminated, and the facing member 23 be flat from top to bottom. However, it is preferred to have a gutter unit and the construction herein is such that the gutter becomes an integral part of the entire cornice assembly. As seen in FIGURE 1 the gutter comprises a substantially U-shaped channel member 68 having a bottom plate 69, rear wall 70 and front wall 71. The rear wall 70 of the gutter is flat to overlie facing member 23, with the upper edge of the gutter bent rearwardly and to provide a hook member 72 receivable within the channel 28, for supporting the gutter E on the fascia A.

The upper edge of the forward wall 71 of the gutter E is bent rearwardly to provide a top plate 73 paralleling the bottom wall 69, and extending inwardly a sufficient distance to permit it to be bent downwardly at right angles, and then forwardly at right angles, to form a forward hook 74.

The gutter E and the fascia A are rigidly secured together by a gutter hanger or spanner F shown in FIGURES 1, 2, 3, and 4. The gutter member F includes a U-shaped channel spanning member having a flat top wall 75 from which there depends, at right angles, side walls 75a. The forward end of the top wall 75 is bent upwardly and rearwardly to define a rearwardly facing hook 78 engageable with the gutter hook 74. The rear of the top wall 75 extends beyond the side walls 75a and is then turned downwardly at right angles to provide a hook 77 also receivable in the gutter channel 28. Intermediate its ends, top wall 75 is cut at 81 to provide an upwardly and rearwardly projecting holding tab 82, and each of the side walls 75a adjacent their forward ends are provided with cut out portions or tabs 79 at an angle to the vertical, which tabs are bent upwardly to provide positioning and holding tabs 80.

With the spanning member so constructed it will be seen that the hook 74 of the gutter member, and the forward hook 70 of the spanning member provide interconnecting hooks for securing the two together, and the rearwardly depending member 77 fits into the facing member channel 28 rearwardly of the gutter hook member 72, these parts being so constructed that there will be frictional engagement between them when assembled. When the spanning member is in position the tabs 80 at the forward end of the side walls of the spanner are turned upwardly and the angle is such that their forward edges will frictionally engage the edge of the gutter member and interlock the forward end of the spanner to the gutter member.

The spanner is retained in position by a lock jack 83 which functions to rigidly interconnect the gutter to the fascia. The lock jack 83 comprises a substantially triangular member having a top wall 84 and side wall 84a. As best seen in FIGURE 1, the triangular side walls 84a have a rear edge of substantially equivalent length to the distance between the top 75 of the spanner member and the bottom wall 29 of the eave trough or channel 34, with bottom edges extending from the facing member 23 forwardly, and terminating short of the positioning tab 82 of the spanner member. The forward end 86 of top wall 84 of the triangular member projects forwardly beyond the side walls and engages the upwardly projecting tab 82. As seen in FIGURE 2 the triangular portion of the lock jack 83 is narrower than the top member 75 of the spanner and the lower edges of the side portions of the triangular portion are provided with horizontally extending members to overlie the wider spanner, and the side members 85 are bent downwardly and parallel to the sides of the spanner, and have portions 87 projecting below the side walls of the spanner.

With the construction described the top wall 84 together with its projecting end 86 is made of greater length than the distance between the base of the tab 82 and the intersection of the facing member with the bottom wall of the channel 34, whereupon the rear and bottom edges of the side walls 84a will not engage the fascia and spanner. By bending downwardly on top plate 84 the jack will be forced downwardly and rearwardly it being apparent that upon the exertion of pressure upon the triangular portion, the forward end of the jack 83 is restrained from movement by the tab 82 resulting in a bending action at the intersect of 84 and 86 which acts to push the jack backwardly and downwardly into engagement with the facing member and top of the spanner. Thereafter the depending side wall tabs 87 are bent underneath the spanner walls 75a to secure the jack in position.

It thus becomes apparent that the gutter spanner bar and jack are rigidly secured to the fascia by interengaging frictional means, which because of the lightness and flexibility of the material may be secured by manual force without the use of any special tools.

As previously stated the fascia, gutter, and soffit plate are preferably made in lengths of not less than 16 feet in length. Hereinafter there will be described preferred means for interconnecting each length to the other.

In FIGURES 10–12 there is shown gutter connecting section 88 having a bottom wall 91, rear wall 89, channel 90 and front wall 92 corresponding to the walls 69, 70, and 71 of the gutter section (see FIGURE 12), except that the gutter connector is of such size that it fits externally around the gutter. As best seen in FIGURE 10 the forward wall of the gutter connector 88 is bent forwardly and then upwardly in like manner to the gutter, but the upwardly projecting wall 93 is provided with a plurality of slots 94 dividing it into tabs 95. It thus becomes apparent that where two sections of gutters meet, the gutter connector is placed underneath same with the channel 90 fitting within the fascia channel and the parts secured by folding or bending over the tabs 95 as clearly shown in FIGURE 12.

FIGURES 13 to 15 illustrate a gutter connector outlet section in accordance with the present invention which may be used to connect to adjacent gutter sections as well as to provide a drain pipe to conduct rain water to the ground. This gutter connector outlet section generally designated by reference numeral 96 is substantially similar to gutter connecting section 88 of FIGURES 10–12, and the elements 89' to 95' correspond to the elements 89 to 95 described previously. The upper portion of a drain pipe 98 is provided with a reverse bend portion 99 and a upper flange portion 100 which cooperates to form a groove by which the drain pipe is secured to the bottom wall 91' of the connector outlet section. From FIGURES 14 and 16 it is apparent that gutter connector outlet section 96 fits externally around the adjacent gutter sections.

FIGURES 16 to 21 illustrate a gutter clip end cap generally designated by reference numeral 101, and the manner in which this end cap may be quickly secured in place by bending over tab portions. The gutter clip end cap includes an end wall 102 having its upper edge bent over to form a reinforcing flange 103. One side of end wall 102 is provided with triangular tabs 104, 105 and a U-shaped tab portion 106 provided with an aperture 107 in the middle thereof. The lower edge of end wall 102 has a U-shaped tab portion 108 having an aperture 109, and the other side of the end wall is provided with tabs 110 and 111 which are substantially perpendicular to each other, and with the U-shaped tab 112 having an aperture 113. Aperture 107, 109 and 113 are adapted to receive tabs 114, 115 and 116 which are provided in the ends of walls 70, 69 and 71 respectively of the gutter. As is apparent from FIGURE 21, after the tabs such as the tab 115 is inserted through the corresponding aperture, the tabs may be manually bent over to securely fasten the gutter clip end cap in place.

In FIGURES 22 to 24 there is shown a gravel stop which may be employed as an integral part of the cornice system of the present invention. As is clearly shown, a gravel stop unit generally designated by reference numeral 117 has a substantially flat main portion 118 provided with a plurality of cut outs 121 to form bending tabs 122, a substantially triangular gravel stop 120, and a U-shaped edge portion 119. Edge portion 119 is shaped to resiliently engage over drip edge 32 as shown in FIGURE 23. Tabs 122 are then bent over behind the upper channel wall to securely fasten the gravel stop in position.

In FIGURES 25 to 28 there is shown a top cornice connector 123 and a bottom cornice conneector 124 which are constructed to be snapped into position over the abutting edges of adjacent fascia members A.

Referring to FIGURES 25 and 27, the upper cornice connector includes a flat portion 129 adapted to overlie the upper channel wall 33 and having cut outs 130 which form tabs 131. The U-shaped intermediate portion 128 resiliently fits over the drip edge 32 while the bent portions 125, 126 and 127 abut against the upper vertical portion of facing member 23, the bottom of channel 28, and the outer surface of channel bottom 31, respectively.

As shown in FIGURES 26 and 27, the bottom cornice connector 124 includes a main vertical wall portion 132 adapted to the portion 26 of the facing member with bent portions 133 and 134 engaging the lip 27. At the bottom of the cornice connector, horizontal portion 135 abuts ledge 36 with the upwardly bent portion 136 which is provided with cut outs 137 and bend over tabs 138 secured over lip 38.

While preferred embodiments of the present invention have been shown and described, it is apparent that the invention is susceptible of many changes and modifications without departing from the spirit thereof. It is accordingly intended to encompass all such changes and modifications as fall within the spirit and scope of the appended claims.

What is claimed is:

1. In combination with a building having a vertical wall and a roof and covering therefor, a fascia formed from an elongated strip of sheet metal and including a substantially vertical main portion, a substantially horizontal rearwardly extending lower portion connected to the bottom of said main portion, a substantially horizontal soffit formed of an elongated strip of sheet metal, means integral with said lower portion of the fascia to frictionally engage and secure one edge of said soffit, said last mentioned means being disposed along the length of said lower portion and including portions resiliently biased towards engagement with each other, means secured to the wall of the building to frictionally engage and secure the rear edge of said soffit, an upwardly facing channel member integral with said main portion of said fascia intermediate its upper and lower edges, and a gutter having means received in said channel.

2. A cornice unit for buildings having rafters projecting beyond the side walls thereof comprising a vertical facing member to overlie the ends of the rafters, an upwardly facing channel integral with the facing member intermediate its upper and lower edges and adapted to engage a gutter, a soffit extending horizontally and rearwardly from the lower edge of the facing member to underlie the projecting rafters, spaced spring acting mold bars respectively supporting the front and rear edges of the soffit, each mold bar having a pair of cooperating legs resiliently urged towards each other, means supporting one mold bar at the rear lower edge of the facing member, means to secure the other mold bar to a bulding wall, a plurality of vertical elongated flat hanger members having their forward edges positioned against and spaced along the rear face of said facing member, each hanger member having a side face positioned against the side of one of the rafters, means to secure said hanger members to said rafters, and each hanger member having at its lower end means in supporting engagement with said one mold bar.

3. The cornice unit defined in claim 2 including a U-shaped gutter, the rear upper edge of the gutter having a downwardly turned hook received in the upwardly facing channel of the facing member, and means spanning the gutter and frictionally engaging and interlocking the front edge and rear edge of the gutter and the facing member and securing the gutter to the facing member.

4. The cornice defined in claim 3, wherein said gutter includes a main longitudinal portion of essentially U-shaped configuration, and a gutter end clip at at least one end of said longitudinal portion, said gutter end clip including tab portions bent into engagement with adjacent portions of said longitudinal portion, and said gutter end clip being provided with aperture means, said longitudinal portion having tab means secured within said aperture means.

5. A gutter support comprising a spanning member and a locking member, said spanning member having a top plate terminating at each end in holding means, and side plates depending from the top plate, a latching tab projecting upwardly from the top plate of the spanning member intermediate its ends, a locking member having triangular side walls interconnected by a front of less width than the top plate of the spanning member, the base of each side wall having horizontal members projecting therefrom to the edges of the top plate of the spanning member and side plates depending from the horizontal members and of greater depth than the spanning member side plates, the forward end of the front wall of the locking member projecting forwardly beyond the side walls and engaging the spanning member latching tab.

6. In combination, a vertical facing member having a forwardly projecting lip at its upper edge, an upwardly facing U-shaped channel secured to the facing member intermediate of its top and bottom edges, a U-shaped gutter, a downwardly depending hook member secured to the rear edge of the gutter and received in the facing member channel, a forwardly facing hook member secured to the inner edge of the forward edge of the gutter, a spanning member having a hook at its forward end engaging the gutter hook, and a depending hook at its rear edge received in the facing member channel behind the gutter hook, and an upwardly projecting latching tab intermediate of its ends, and a bendable locking member engaging the spanning member latching tab at its lower end and engaging adjacent the intersection of the facing member and the projecting lip at its upper end.

7. In combination, a vertical facing member for overlying the rafter ends of a building, the lower edge of the facing member below the rafter end having a first portion turned rearwardly and having a second portion extending forwardly and upwardly to define a forward facing acute angle spring member, and a hanger member for securing the facing member to one of the rafter ends comprising a vertically elongated rectangular flat member having its forward edge positioned against the rear face of the facing member, one side face of said hanger being positioned against the side of one of the rafter ends, and having a rearwardly facing acute angle hook at its lower end positioned within the forward facing acute angle spring member of the facing member.

8. In combination with a building having a sloping roof and covering therefor, side walls and rafters projecting beyond the side walls, a fascia comprising an elongated piece of light weight material having a vertical facing member overlying the rafter ends, the lower edge of the facing member below the rafter ends having a first substantially horizontal portion turned rearwardly toward the side wall of the building, a second portion bent upwardly and rearwardly at an obtuse angle with respect to said first portion, a third portion bent backwardly to abut the upper surface of said second portion, a fourth portion bent upwardly with respect to said third portion, a fifth portion secured to said fourth portion and extending rearwardly and downwardly therefrom and resiliently urged towards engagement with the upper ends of said second and third portions, an elongated soffit of a light weight material having one end thereof resiliently secured between said fifth portion and the upper ends of said second and third portions, a plurality of vertically elongated hangers, each hanger having its forward edge positioned essentially against the rear face of the facing member and having its lower end received between said first portion and said fourth portion of said facing member to support the same, said hangers being disposed along the length of the facing member, and means to secure said hangers to said rafters.

9. A cornice unit for buildings having rafters projecting beyond the side walls thereof comprising a vertical facing member to overlie the ends of the rafters, a soffit extending horizontally and rearwardly from the lower edge of the facing member to underlie the projecting rafters, spaced spring acting mold bars respectively supporting the front and rear edges of the soffit, each mold bar having a pair of cooperating legs resiliently urged towards each other, means supporting one mold bar on the rear lower edge of the facing member, means to secure the other mold bar to a building wall, a U-shaped rearwardly facing channel secured to the upper edge of the facing member, said channel being positioned to overlie the rafters and adapted to receive the ends of the sheathing of a building, and a gravel stop having means along its longitudinal edges for resiliently engaging portions of said channel to position said gravel stop along the top surface of said channel.

References Cited

UNITED STATES PATENTS

| | | | |
|---|---|---|---|
| 936,040 | 10/1909 | Ruckle | 52—11 |
| 980,089 | 12/1910 | Ford | 50—66 |
| 1,054,723 | 3/1913 | Todd | 248—48.1 |
| 1,480,246 | 1/1924 | Douglas | 50—66 |
| 1,723,204 | 8/1929 | Petersen | 50—66 |
| 1,931,750 | 10/1933 | Blaski | 50—66 X |
| 1,962,785 | 6/1934 | Nord | 248—48.1 |
| 2,178,507 | 10/1939 | Williams | 50—66 X |
| 2,348,180 | 5/1944 | Paley | 50—66 X |
| 2,421,978 | 6/1947 | Andrews | 50—4 |
| 2,431,012 | 11/1947 | Alig | 248—48.1 |
| 2,857,861 | 10/1958 | Trostle | 52—94 |
| 2,896,559 | 7/1959 | Stephens | 50—66 |
| 2,930,652 | 3/1960 | Bidlingmair et al. | 50—4 X |
| 3,098,322 | 7/1963 | Greene | 50—4 |
| 3,100,951 | 8/1963 | Hickman | 50—66 |
| 3,135,070 | 6/1964 | Waring et al. | 52—94 |
| 3,181,275 | 5/1965 | Schroter et al. | 52—94 X |

FOREIGN PATENTS

| | | |
|---|---|---|
| 209,055 | 6/1957 | Austria. |
| 79,140 | 1919 | Switzerland. |

OTHER REFERENCES

House and Home; page 106; December 1958.

EARL J. WITMER, *Primary Examiner.*